UNITED STATES PATENT OFFICE.

FRIEDRICH SCHMIDT AND OTTO ERNST, OF HÖCHST-ON-THE-MAIN, GERMANY, ASSIGNORS TO THE FARBWERKE, VORMALS MEISTER, LUCIUS & BRÜNING, OF SAME PLACE.

TRISAZO DYE.

SPECIFICATION forming part of Letters Patent No. 582,959, dated May 18, 1897.

Application filed March 5, 1897. Serial No. 625,988. (Specimens.)

*To all whom it may concern:*

Be it known that we, FRIEDRICH SCHMIDT and OTTO ERNST, doctors of philosophy, citizens of the Empire of Germany, residing at Höchst-on-the-Main, Germany, have invented certain new and useful Improvements in the Manufacture of Trisazo Dyestuffs, of which the following is a specification.

Our invention relates to the manufacture of a bluish-black trisazo dyestuff which can be developed on the fiber with considerable strength and fastness. We have found that dioxynaphthalenemonosulfonic acid 1.8.4 is capable of combining with two molecules of diazo compound and gives a valuable black direct-dyeing cotton dyestuff by combining one molecule of diazonaphthalenesulfonic acid with the said acid, next combining the monoazo dyestuff thus formed with one molecule of tetrazotized benzidin to a so-called "intermediary" product, which is capable of being further diazotized by combining it with naphthylamin or its homologues, so that a trisazo dyestuff of the combination $$\text{Benzidin (tetrazotized)} \Big\langle \begin{array}{l} \text{Dioxynaphthalenemonosulfonic acid 1.8.4 naphthionic acid (diazotized)} \\ \text{Alpha-naphthylamin} \end{array}$$

is obtained.

5.18 kilograms of the monoazo dyestuff from dioxynaphthalenesulfonic acid 1.8.4 (S) and diazotized naphthylaminsulfonic acid are dissolved with four kilograms of soda in the requisite quantity of water, to which is added, under continuous stirring and at a low temperature, a tetrazo solution obtained in the usual way from 1.84 kilograms of benzidin. After one to two hours' stirring a difficultly-soluble intermediary product is formed. Hydrochloric acid is then carefully added until the reaction of the liquid distinctly shows an acid character, whereupon a solution of 1.85 kilograms of hydrochlorid of alpha-naphthylamin is introduced. After several hours' stirring the formation of the dyestuff is completed. By a careful addition of a soda solution the liquid is again made of a weak alkaline character, whereby the dyestuff, however, does not dissolve.

In a dry state the dyestuff forms a violet-brown powder of metallic luster and is soluble in water with a bluish-violet color. The color of this solution changes on addition of ammonia into a dull-red violet. It is soluble in concentrated sulfuric acid with a blue color, while by addition of water a reddish-brown precipitate is obtained. The direct-dyeing color of four per cent. on unmordanted cotton is a saturated blue-black, which on being diazotized and developed on the fiber considerably increases its power of dyeing and fastness.

Having thus described our invention, we claim as new and desire to secure by Letters Patent—

1. The process herein described of producing a bluish-black trisazo dyestuff, which consists in combining one molecule of diazonaphthalenesulfonic acid with one molecule of dioxynaphthalenemonosulfonic acid 1.8.4, subjecting the monoazo dyestuff thus formed to the action of one molecule of tetrazotized benzidin until a so-called "intermediary" product is obtained, and lastly treating the intermediary product with naphthylamin, substantially as described.

2. The new trisazo dyestuff of the combination:

$$\text{Benzidin (tetrazotized)} \Big\langle \begin{array}{l} \text{Dioxynaphthalenemonosulfonic acid 1.8.4 naphthionic acid (diazotized)} \\ \text{Alpha-naphthylamin,} \end{array}$$

forming in a dry state a violet-brown powder of metallic luster, soluble in water with a blue-violet color, turning to a dull-red violet on addition of ammonia, soluble in concentrated sulfuric acid with a blue color, the direct-dyeing color of four per cent. on unmordanted cotton being bluish black, substantially as set forth.

In testimony that we claim the foregoing as our invention we have signed our names in presence of two subscribing witnesses.

FRIEDRICH SCHMIDT.
OTTO ERNST.

Witnesses:
HEINRICH HAHN,
ALFRED BRISBOIS.